United States Patent
Mochizuki et al.

(10) Patent No.: US 6,459,220 B1
(45) Date of Patent: *Oct. 1, 2002

(54) SPINDLE-MOTOR CONTROL METHOD, SPINDLE-MOTOR CONTROL DEVICE, SPINDLE-MOTOR DRIVE CIRCUIT AND DISK DEVICE

(75) Inventors: Hideshi Mochizuki, Kawasaki; Hiroshi Kumita, Higashichikuma-gun; Shigenori Yanagi, Kawasaki; Tomoki Yokoyama, Higashine, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/546,916

(22) Filed: Apr. 11, 2000

(30) Foreign Application Priority Data

Sep. 20, 1999 (JP) ............................................ 11-304472

(51) Int. Cl.[7] ................................................. H02P 6/02
(52) U.S. Cl. ....................................... 318/254; 318/439
(58) Field of Search ................................. 318/254, 685, 318/696, 439, 138, 137, 476, 490, 798, 799, 807

(56) References Cited

U.S. PATENT DOCUMENTS

| 5,012,166 A | * | 4/1991 | Ushijima et al. ........... 318/254 |
| 5,530,326 A | * | 6/1996 | Galvin et al. ............... 318/254 |
| 5,682,334 A | * | 10/1997 | Photowski et al. ......... 318/565 |
| 5,929,589 A | * | 7/1999 | Suzuki et al. ............... 318/685 |
| 6,144,178 A | * | 11/2000 | Hirano ....................... 318/476 |

FOREIGN PATENT DOCUMENTS

| JP | 10-337067 | 12/1998 |
| JP | 11-58816 | 3/1999 |

* cited by examiner

Primary Examiner—Khanh Dang
(74) Attorney, Agent, or Firm—Greer, Burns & Crain, Ltd.

(57) ABSTRACT

This invention relates to a control method, control device, and drive circuit for controlling the rpm of a spindle motor in order to reduce the rise time of the spindle motor. There is a discharge circuit (91-2) in the charge pump (91) of a spindle-motor driver (38). A control circuit (12) detects when the rpm of the spindle motor reaches near a target rpm, and discharges the charge pump (91). In this way, the rotation error near the target rpm is discharged, so it is possible to control and suppress overshoot. This makes it possible to reduce the rise time.

20 Claims, 15 Drawing Sheets

| Normal rotation | Lock | Normal | | Idle |
|---|---|---|---|---|
| 3214 rpm | < 15 | 15 ≦ | ≦ 100 | 100 < |
| 4558 rpm | < 19 | 19 ≦ | ≦ 125 | 125 < |

SPINDLE-MOTOR CONTROL METHOD, SPINDLE-MOTOR CONTROL DEVICE, SPINDLE-MOTOR DRIVE CIRCUIT AND DISK DEVICE

BACKGROUND OF THE INVENTION

1. Field of the Invention

This invention relates to a spindle-motor control method, spindle-motor control device, spindle-motor drive circuit and disk device for controlling the rpm of a spindle motor, and more particularly to a spindle-motor control method, spindle-motor control device, spindle-motor drive circuit and disk device that are suitable for application in the control of a spindle motor that rotates a disk medium.

2. Description of the Related Art

Spindle motors are widely used as rotation drive. For example, disk drives that read or read/write data stored on a disk have a spindle motor for rotating the disk medium. When bringing this kind of spindle motor from the stopped state or low-speed rotation state to a target rpm(rotation speed), it is necessary to bring it to the target rpm quickly.

Devices that have spindle motors are used in a wide range of fields. Here, an example of a magneto-optical memory storage device, used as an external memory storage device for a computer, is explained. In a magneto-optical storage device, a magneto-optical medium is used for storing data. This medium has a substrate and a recording layer made of magnetic material that is formed on the substrate. This medium stores information by utilizing the change in heat and magnetic field caused by light.

There is a data track on this medium for recording and reproducing the data. Generally, a spiral shaped groove (tracking groove) is formed on the top of the substrate of the disk medium. The recording/reproduction track for data is formed on the land between grooves.

The optical beam from an optical head tracks this track. Information is recorded on the track during recording by using the change in heat and magnetic field caused by light. Moreover, when reproducing the information, the magneto-optical effect is used to reproduce the information from the reflected light of the light beam.

To record or reproduce information on the optical disk medium, it is necessary to constantly rotate the optical disk medium. A spindle motor is used to do this. A brushless motor is used as this spindle motor.

When the rotation precision of this spindle motor is not sufficient, tracking of the laser beam on the disk medium becomes unstable, and also becomes cause of error when recording or reproducing information on the disk medium. Therefore, it is necessary to maintain stable high-speed rotation.

PLL (Phase Locked Loop) control (phase synchronization control) has been used as a prior motor-rotation control method for maintaining stable rotation precision. In this system, the phase of the oscillation pulse of a liquid-crystal oscillator is compared with the rotation pulse (FG) that is generated when the motor rotates, to obtain the phase difference. This phase difference is stored in the charge pump, and then its waveform is adjusted to obtain a rotation-error signal. This rotation-error signal becomes the drive current for the motor. This makes it possible to obtain rotation with stable rotation precision. In this system, in order to improve the rotation jitter characteristics during steady rotation of the motor, the response characteristic of the charge pump is set to be slow.

However, the prior art has the following problems.

For example, in the magneto-optical disc device described above, the optical medium is loaded into the device. When doing this, the spindle motor is in the stopped state. After the disk medium has been mounted, the spindle motor is started. After the spindle motor has started and reached steady rotation, initial processing and tracking-servo processing are performed to match the characteristics of the mounted medium. The loading process is then completed and the device is in the ready state. However, in recent years, as a way of improving the data transfer rate, there is trend to increase the rpm of the spindle motor. When the rpm is increased, the amount of time required from start up until reaching steady rpm becomes longer. This increases the time required by the loading process from when the medium is mounted until the device is capable of an external interface (SCSI/ATAPI IF), and thus there is a possibility of a timeout error with the interface.

Magneto-optical memory storage devices are widely used as compact, external memory devices for personal computers. In this case, it is necessary to decrease the power consumption of the device. Therefore, a sleep function is used in order to reduce the power consumption and to prevent damage (changes in device over time or in medium characteristics) due to a rise in temperature. For example, when there is no access for a certain amount of time or more, then the following operation of the track stops, light emission from the laser diode stops, rpm of the spindle motor drops or stops. In addition, when a command for accessing the disk medium is received, it is necessary that the device quickly return to the ready state. In other words, when the spindle motor is stopped, or when rotation is locked in at an rpm that is slower than the steady rpm, it is necessary that the spindle motor is started quickly and that rotation is quickly brought to an rpm that will allow access of the medium.

A problem occurs however, in that the loading time or ready time become slower as the steady rpm of the spindle motor becomes faster.

In the PLL circuit of a prior spindle motor, in order to improve the rotation jitter characteristics at steady rotation of the spindle motor, the response characteristic of the charge pump is set to be slower. Therefore, when the rpm of the spindle motor is increasing, there is large overshoot, and a problem occurs in that it is not possible to reduce the time required after start up for rotation to become steady at the target rpm.

Conversely, when the response characteristic of the charge pump is set to be fast, the rotation jitter characteristic of the spindle motor at steady rotation decreases, and fluctuation in rotation occur at steady rotation.

SUMMARY OF THE INVENTION

In view of the problems described above, the object of this invention is to provide a spindle-motor control method, spindle-motor control device, and spindle-motor drive circuit for reducing the time from when the spindle mode is stopped or rotating at low speed until it reaches a target speed.

Another objective of the invention is to provide a spindle-motor control method, spindle-motor control device, and spindle-motor drive circuit for reducing the rise time of the spindle motor while maintaining the rotation precision at a constant rpm.

A further objective of the invention is to provide a spindle-motor control method, spindle-motor control device, and spindle-motor drive circuit for reducing the amount of overshoot that occurs during the rise time of the spindle motor.

The spindle-motor control method of this invention comprises: a step of detecting an actual speed of the spindle motor, a step of extracting a difference between a target speed and the actual speed, a step of charging a charge pump with that difference, a step of driving the spindle motor according to the charge amount, a step of detecting when the actual speed of the spindle motor reaches near the target speed, and a step of discharging the charge pump for a prescribed time according to the detection.

In this feature of the invention, the overshoot during the rise time is suppressed by discharging the difference that is stored in the charge pump. To control this overshoot, when it is detected that the actual speed of the spindle motor has reached near the target speed, the charge pump discharges for a prescribed amount of time. This makes it possible to control the amount of overshoot.

Moreover, since the response characteristic of the charge pump is not changed, it is possible to stably maintain rotation at the target speed.

In another feature of the invention, the aforementioned arrival detection step comprises a step of detecting when the actual speed of the spindle motor reaches the near the target speed after the spindle motor has been started.

This makes it possible to reduce the rise time to the target rpm when starting the spindle motor from the stopped state.

In another feature of the invention, the aforementioned arrival detection step comprises a step of detecting when the actual speed of the spindle motor has arrived at near the target high-speed speed after an instruction has been given for the spindle motor, rotating at low speed, to rotate at high speed.

Another feature of the invention further comprises a step of learning the prescribed time for performing the aforementioned discharge. This makes it possible to automatically obtain a discharge time that will minimize the rise time.

Another feature of the invention further comprises a step of setting a prescribed time for performing the aforementioned discharge according to the surrounding temperature. By setting the discharge time according to the surrounding temperature, it is possible to reduce the rise time regardless of changes in the surrounding temperature.

Another feature of the invention further comprises a step of setting a prescribed time for performing the aforementioned discharge according to the power-supply voltage. By setting the discharge time according to the power-supply voltage, it is possible to reduce the rise time regardless of changes in the power-supply voltage. This is especially useful when using a battery-driven device.

The spindle-motor control device of this invention comprises: a detection means for detecting the actual speed of the spindle motor; a drive circuit for extracting the difference between the target speed and the actual speed, charging the charge pump with this difference and driving the spindle motor according to the charge amount; and a control circuit for detecting when the actual speed of the spindle motor arrives near the target speed and discharging the charge pump for a prescribed time.

In this feature of the invention, the overshoot during the rise time is controlled by discharging the difference amount that is stored in the charge pump. To control this overshoot, when it is detected that the actual rpm of the spindle motor has reached near the target rpm, the charge pump discharges for a prescribed amount of time. This makes it possible to control the amount of overshoot.

Moreover, since the response characteristic of the charge pump is not changed, it is possible to stably maintain rotation at the target rpm.

In another feature of the spindle-motor control device of this invention, the charge pump comprises a discharge circuit operated by the control circuit and for discharging the charge pump. Since there is a discharge circuit, it is possible to easily discharge the charge pump.

In another feature of the spindle-motor control device of this invention, the aforementioned discharge circuit is operated by the tri-state buffer of the control circuit. With this it is not necessary to have a special switch for operating the discharge circuit.

In another feature of the spindle-motor control device of this invention, the aforementioned discharge circuit comprises a switch that is operated by the control circuit. This makes it possible to operate the discharge from a port of the control circuit.

The spindle-motor drive circuit of this invention comprises an extraction circuit for extracting the difference between the target rpm and the actual rpm of the spindle motor, a charge pump that is charged with this difference, and a drive circuit for generating a drive signal for the spindle motor according to the amount of charge of the charge pump, wherein the charge pump is operated externally and comprises a discharge circuit for discharging the charge pump.

By discharging the difference stored in the charge pump, it possible to control the overshoot during the rise time. Moreover, it is possible to operate the drive circuit externally, and the control circuit can easily operate the discharge. Furthermore, since the response characteristic of the charge pump is not changed, it is possible to stably maintain rotation at the target rpm.

The disk device of this invention comprises the aforementioned spindle-motor drive circuit. This makes it possible to reduce the time from when the start-up command is received until the disk is brought to steady rotation, as well as reduce the time required for the loading process.

DESCRIPTION OF THE PREFERRED EMBODIMENTS

Figure 1:
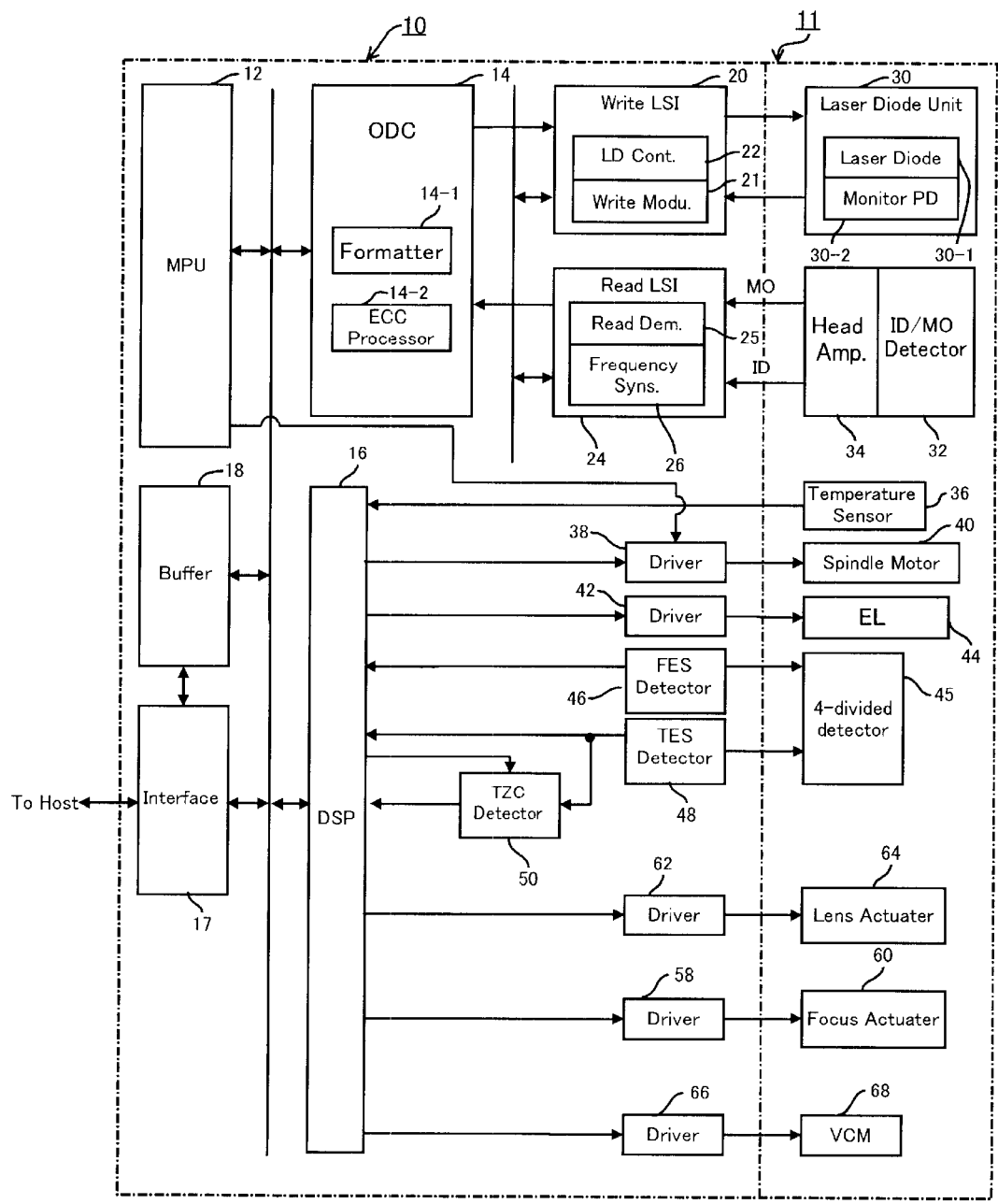
FIG. 1 is a block configuration diagram of a magneto-optical device of an embodiment of the invention.
Figure 2:
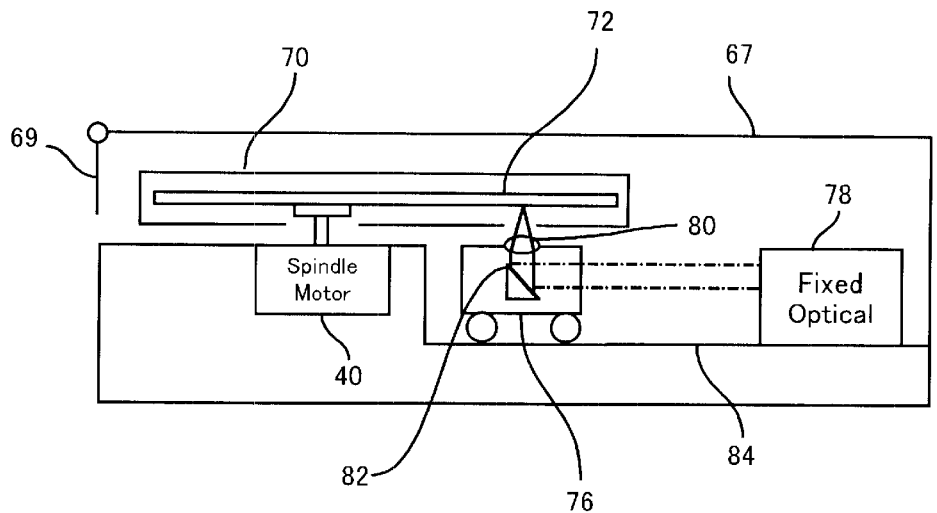
FIG. 2 is a configuration diagram of the optical-disk drive in FIG. 1.

FIG. 1 is a block diagram of a magneto-optical disk device of an embodiment of the invention. FIG. 2 is a configuration diagram of the optical-disk drive in FIG. 1.

As shown in FIG. 1, the magneto-optical disk device comprises a control unit 10 and a disk-drive unit 11. A MPU (microprocessor) 12 performs overall control of the magneto-optical disk device. An interface 17 exchanges commands and data with a host (not shown in the figures). An optical-disk controller (ODC) 14 performs the necessary processing for reading/writing to and from a magneto-optical disk. ADSP (digital signal processor)16 controls all of the mechanisms described later based on an instruction from the MPU 12. A memory (RAM) 18 is used by both the MPU 12, ODC 14 and interface 17 for storing write data and read data.

The ODC 14 has a formatter 14-1 and error correction code (ECC) processing unit 14-2. During write access, the formatter 14-1 divides NRZ write data into the sector unit of the optical disk and generate a recording format. The ECC processing unit 14-2 generates ECC in units of sector data, and adds it to the sector data. In addition, when necessary, the ECC processing unit 14-2 generates cyclic redundancy check (CRC) code and adds its. Furthermore, the ECC processing unit 14-2 converts the sector data, to which ECC has been added, to 1–7 run-length limited code (RLL).

During read processing, the ECC processor 14-2 performs 1–7 RLL reverse conversion of the read sector data and then performs a CRC check. In addition, the ECC processor 14-2 detects and corrects errors by the ECC. Furthermore, the formatter 14-1 links the NRZ data inspector units and creates a NRZ read data stream. This data stream is transferred to the host from the interface 17 by way of the buffer memory 18.

A write LSI circuit 20 comprises a write modulation unit 21 and laser diode control circuit 22. The write modulation unit 21 modulates the write data into bit-position modulation (PPM) record (also called mark record) data format or pulse wide modulation (PWM) record (also called edge record) data format. The laser diode control circuit 22 controls the laser diode unit 30 of the optical unit of the drive 11 using this modulated data. This laser diode unit 30 comprises a laser diode 30 for irradiating a laser beam onto the magneto-optical disk, and a monitor detector 30-2.

The read LSI circuit 24 comprises a read demodulation unit 25 having an AGC (auto gain control) circuit, filter, and sector-mark detection circuit, and a frequency synthesizer 26. The read demodulation unit 25 generates read-clock and read data from an input ID signal or MO signal, and then demodulates PPM data or PWM data into the original NRZ data. An ID/MO detector 32 of the optical head of the drive 11 detects light returning from the magneto-optical disk and inputs an ID signal/MO signal to the read LSI circuit 24 by way of the head AMP 34. The frequency synthesizer 26 generates a frequency clock as the read clock that corresponds to the zone on the magneto-optical disk.

A temperature sensor 36 located in the drive 11 detects the temperature of the drive. The detected temperature is given to the MPU 12 by way of the DSP 16. The MPU 12, based on the detected temperature, maximizes the light-emission power of the laser diode control circuit 22 for reading, writing and erasing.

A spindle motor 40 rotates the magneto-optical disk. The MPU 12 performs start-up, stopping and steady rotation control by way of a driver 38. The driver 38 comprises a PLL circuit, described later in FIG. 3.

An electromagnet 44 supplies an external magnetic field to the loaded magneto-optical disk when writing and erasing. The DSP 16 controls the electromagnet 44 by way of a drive 42 according to an instruction from the MPU 12. A four-division detector 45 detects the light returning from the magneto-optical disk.

A FES detection circuit 46 generates a focus-error signal (FES) from the output of the 4-division detector 45, and inputs it to the DSP 16. The DSP 16 uses the focus-servo loop, described later, to generate a focus-drive signal, and controls a focus actuator 60 by way of a driver 58. The focus actuator 60 drives the objective lens of the optical head in the focus direction. Focus-servo control is performed in this way. In other words, the DSP 16 performs feedback control of the focus actuator 60 so as to minimize the focus-error signal, and controls the focus point of the light beam so that it is positioned on the surface of the recording medium.

A TES detection circuit 48 generates a track-error signal (TES) from the output of the 4-division detector 45, and inputs it to the DSP 16. The TES is also input to a track-zero-cross (TZC) detection circuit 50. The TZC detection circuit 50 generates a TZC pulse and inputs it to the DSP 16.

The DSP 16, based on this TES, uses the track-servo loop described later, to generate a track-drive signal, and controls a track (lens) actuator 64 by way of a driver 62. The track actuator 64 drives the objective lens of the optical head in the track direction. Track-servo control is performed in this way. In other words, the DSP 16 performs feedback control of the track actuator 64 so that the light beam is positioned in the center of the track.

In addition, the DSP 16, based on the TZC, performs seek control and controls a voice coil motor (VCM) 68 by way of a driver 66. The VCM 68 moves the optical head.

FIG. 2 is a configuration diagram of the magneto-optical disk drive 11 in FIG. 1. As shown in FIG. 2, the spindle motor 40 described above is located inside a housing 67. A magneto-optical disk cartridge 70 is inserted from the inlet 69. A magneto-optical disk 72 inside the cartridge 70 is rotated by the spindle motor 40.

The optical head comprises a carriage 76 and fixed optical system 78. The carriage 76 is moved along a rail 84 by the VCM 68 (see FIG. 1) in the direction across the tracks of the magneto-optical disk 72. The carriage 76 comprises an objective lens 80, a directional conversion prism 82, a focus actuator 60, a track actuator 64 and lens position sensor 47. The fixed optical system 78 comprises the laser diode unit 30, ID/MO detector 32 and 4-division detector described above (see FIG. 1).

Figure 3:
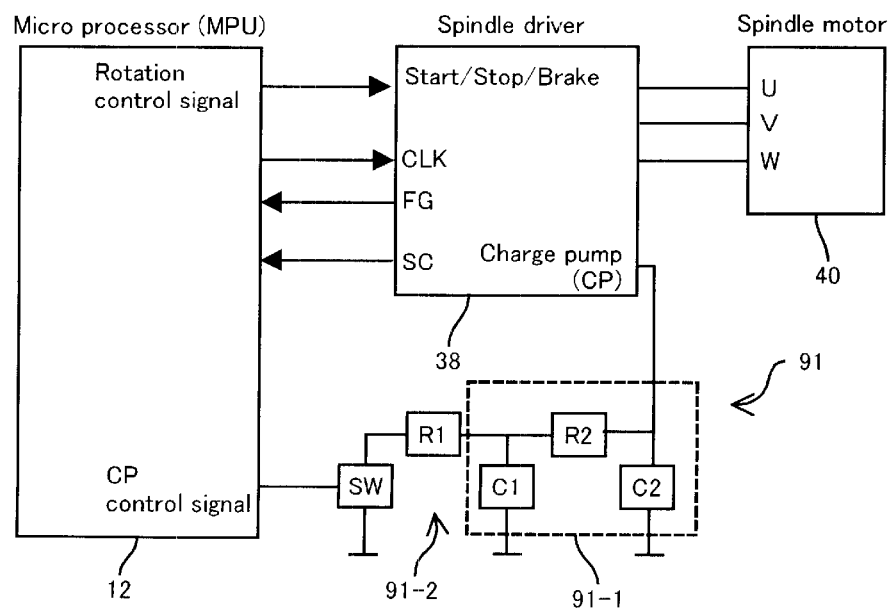
FIG. 3 is a block diagram of the spindle control circuit of an embodiment of the invention.
Figure 4:
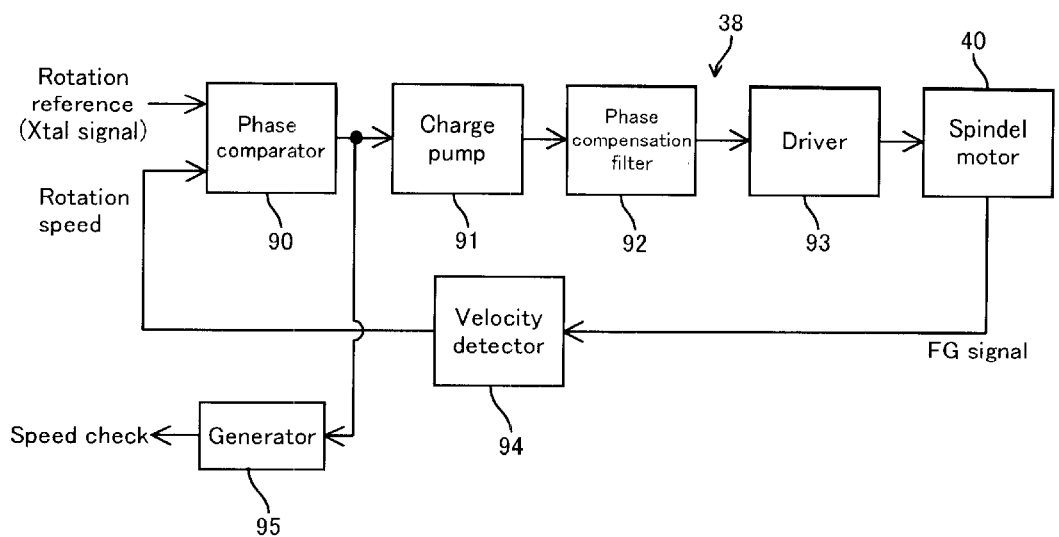
FIG. 4 is a block diagram of the spindle driver in FIG. 3.
Figure 5:
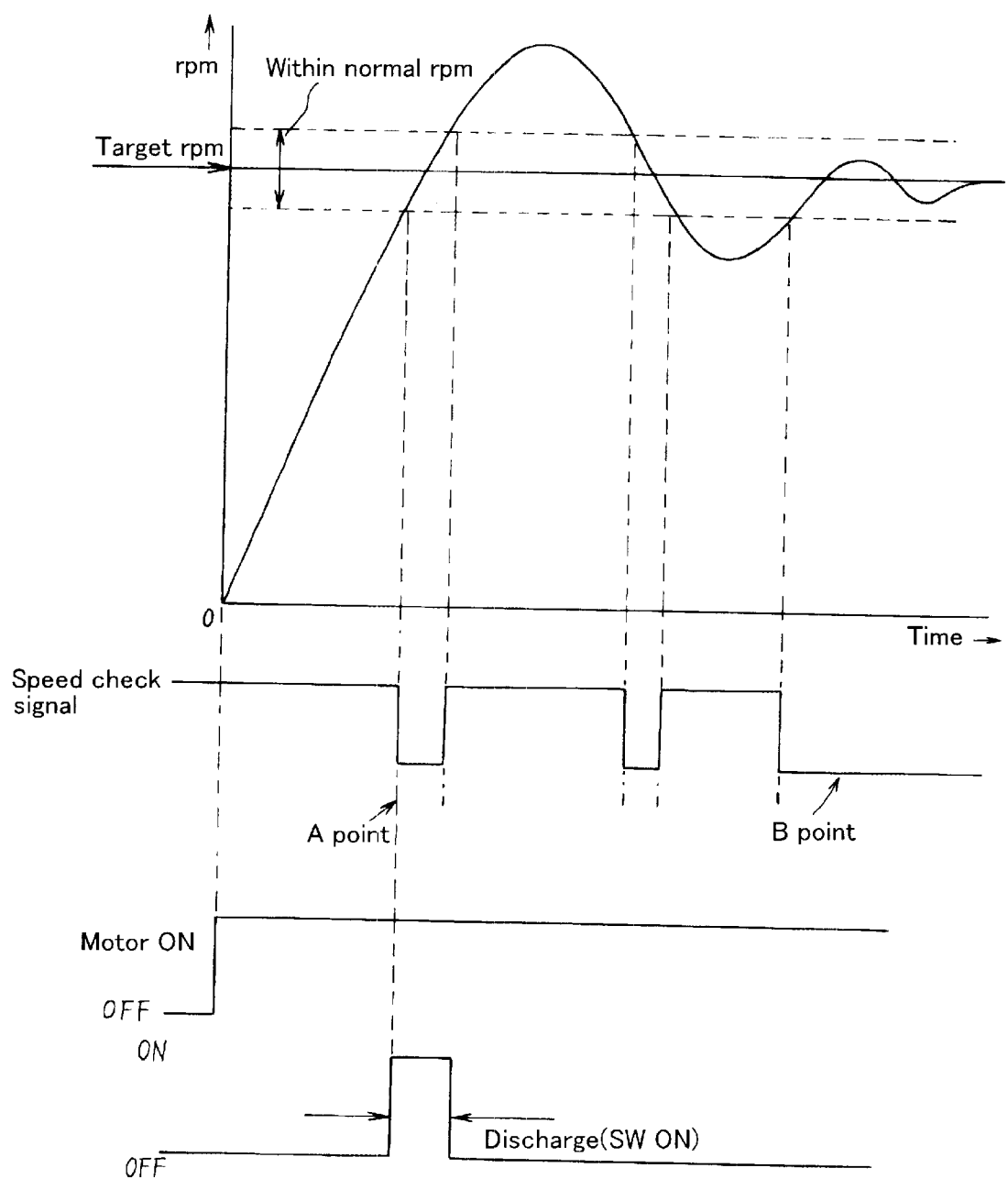
FIG. 5 is a timechart of the circuit in FIG. 4.
Figure 6:
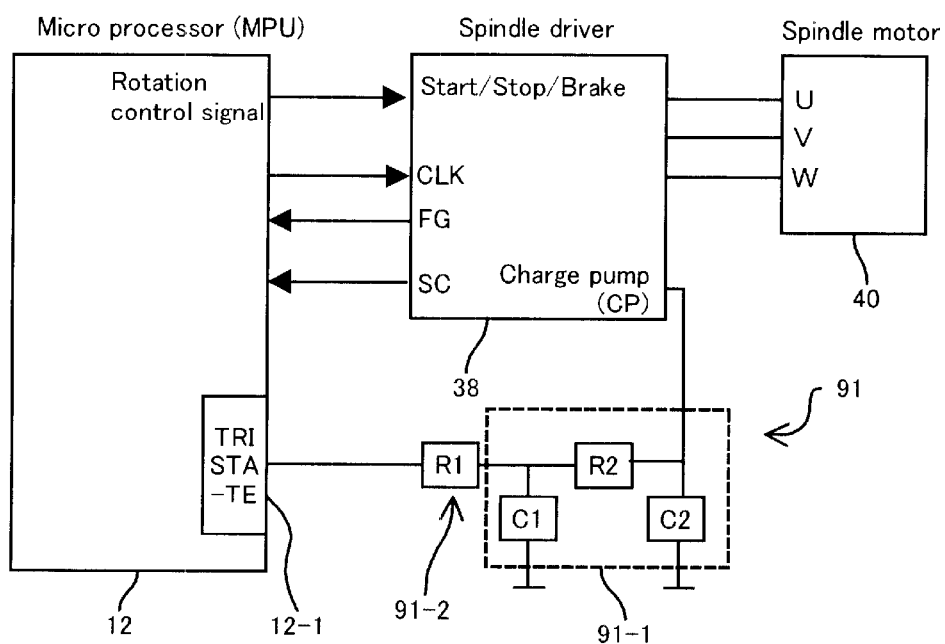
FIG. 6 is a block diagram of another spindle control circuit of an embodiment of the invention.

FIG. 3 is a block diagram of the spindle control circuit of an embodiment of the invention. FIG. 4 is a block diagram of the drive circuit of the spindle motor. FIG. 5 is a timechart for it. FIG. 6 is a block diagram of the spindle-motor control circuit of another embodiment of the invention.

As shown in FIG. 3, the MPU 12 (see FIG. 1) gives a rotate, stop or brake instruction to the spindle driver 38. The spindle driver 38 drives the spindle motor 40 according to the instruction.

The spindle-motor driver 38 is constructed as shown in FIG. 4. In other words, the spindle-motor driver 38 comprises a phase comparator 90, a charge pump 91, a phase compensation filter 92, a drive circuit 93, a speed detector 94 and a speed-check signal generator 95.

A frequency generator (not shown in the figure) is installed concentric with the spindle motor 40, and generates an FG signal of a frequency that is proportional to the rpm of the spindle motor 30. For example, the frequency generator generates a 12-pulse FG signal for each rotation of the spindle motor 40. The speed detector 94 amplifies the FG signal, forms the waveform, adjusts the level and gives an FG pulse to the phase comparator 90.

A clock (reference signal) CLK having the frequency of the target rpm is input from the MPU 12 to the phase comparator 90. This clock CLK is made from the reference clock of a liquid-crystal oscillator. The phase comparator 90 compares the reference clock CLK with the FG pulse, and outputs a phase-difference signal. The charge pump 91 comprises a charge circuit (integrating circuit) and is charged with the phase-difference signal. The amount of charge of the charge pump 91 is input to the phase compensation filter (loop filter) 92 to form the waveform. The drive circuit 93 comprises a current amp and amplifies the output of the phase compensation filter 92 and supplies drive current (rotation error signal) to the spindle motor 40.

In this way, the spindle motor 40 is controlled and feedback control is performed by the rotation error signal (drive current). In this system, control is performed until finally the phase of the reference clock matches the phase of the FG pulse. Constant-speed rotation of the motor is obtained in this way.

The speed-check signal generator 95 determines whether the phase difference in the phase comparator 90 is within a specified range, and generates a speed-check signal SC. In other words, as shown in FIG. 5, with the target rpm in the center, the tolerance range is taken to be the steady rpm range. In addition, the speed-check signal generator 95 determines whether the rpm of the spindle motor 40 is within the steady rpm range, and whether the phase difference in the phased comparator is within the specified range. The speed-check signal SC indicates 'Lo' when the rpm of the spindle motor 40 is within the steady rpm range, and indicates 'Hi' when the rpm of the spindle motor is not within the steady rpm range. This spindle-check signal SC is given to the MPU 12.

The charge pump 91 stores the phase difference in a capacitor, and the current (voltage) stored in the capacitor is the rotation error signal and becomes the drive current for the spindle motor 40. As shown in FIG. 3, the charge pump 91 comprises a charge (integrating) circuit 91-1 having two capacitors C1, C2, and a resistor R2. The charging characteristics of this charge circuit as set so as to suppress rotation jitter during steady rotation.

As shown in FIG. 5, when starting the motor, the rpm of the motor increases over time after the motor is turned ON. When it exceeds the target rpm and overshoot occurs, it becomes steady at the target rpm. The spindle motor 40 is driven according to the amount of rotation error, so after the motor is started, it is possible to control the aforementioned overshoot by discharging the rotation error that is stored in the charge pump 91 at proper timing and for a proper amount of time. This makes it possible to quickly arrive at the steady rpm.

As shown in FIG. 3, provided is a discharge circuit 91-2, having a resistor R1 and a switch SW, in the charge pump 91. This switch SW is opened and closed by the output from the output port of the MPU 12. Also, the MPU 12 receives the speed-check signal SC for the spindle motor 40 when the motor starts, and monitors when the rpm of the spindle motor 40 arrives at near the target rpm (within the steady rpm range). As shown in FIG. 5, when the rpm of the spindle motor 40 reaches near the target rpm (within the steady rpm range), the MPU 12 closes the switch SW from the output port, and discharges the charge pump 91 for a set time. This reduces the amount of rotation error, and makes it possible to control overshoot.

Moreover, as shown in FIG. 6, it is possible to located the discharge circuit 91-2, having a resistor R1, in the charge circuit 91-1 of the charge pump 91, and to have this resistor R1 connect to the port of the tri-state buffer 12-1 of the MPU 12. The tri-state buffer 12-1 can take three states: 'Hi', 'Lo' or 'Open'. Therefore, it is possible to do away with the switch SW of the discharge circuit in FIG. 3.

Figure 7:
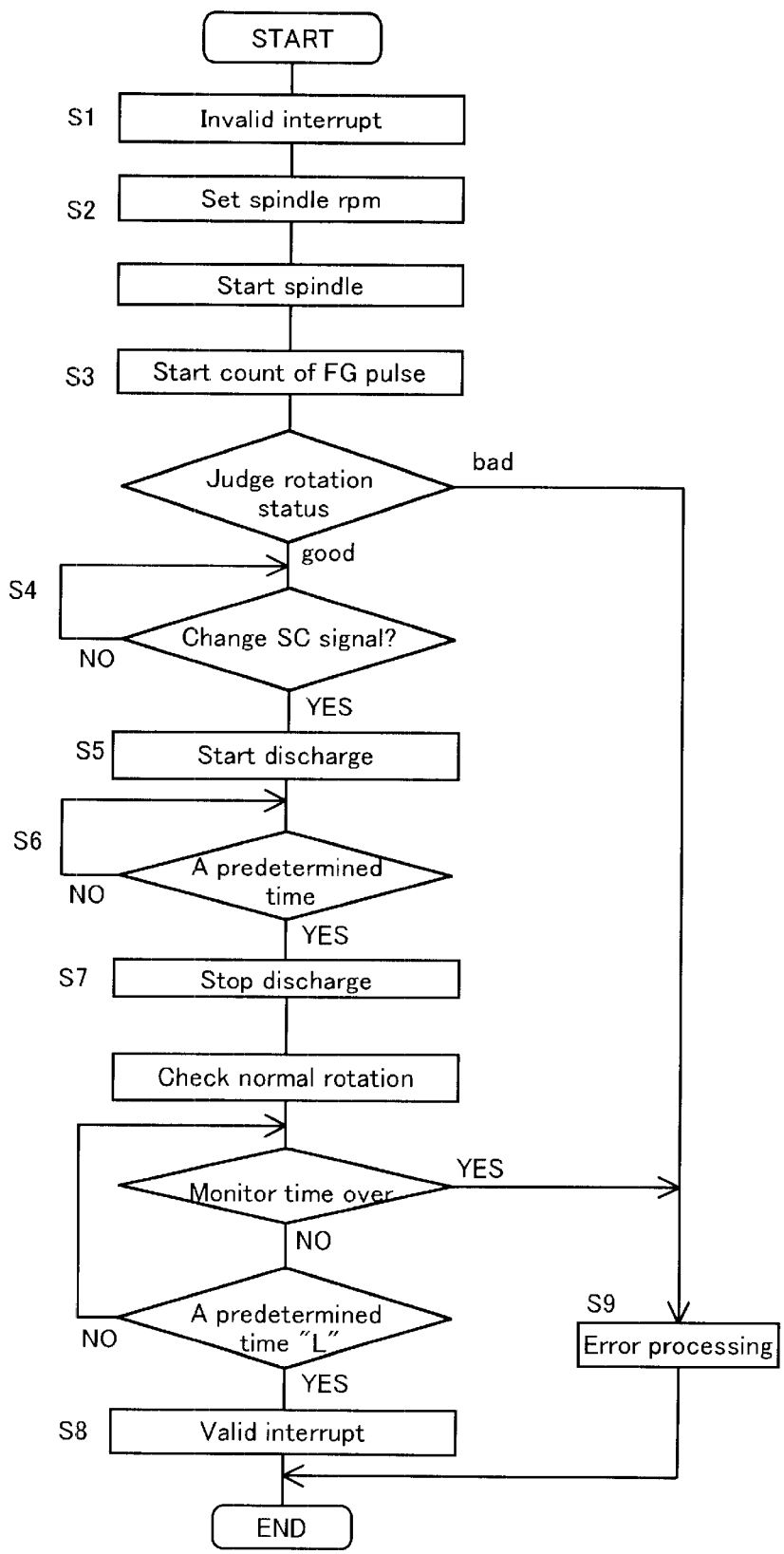
FIG. 7 is a flowchart of the spindle start-up process of an embodiment of the invention.
Figures 8, 9:
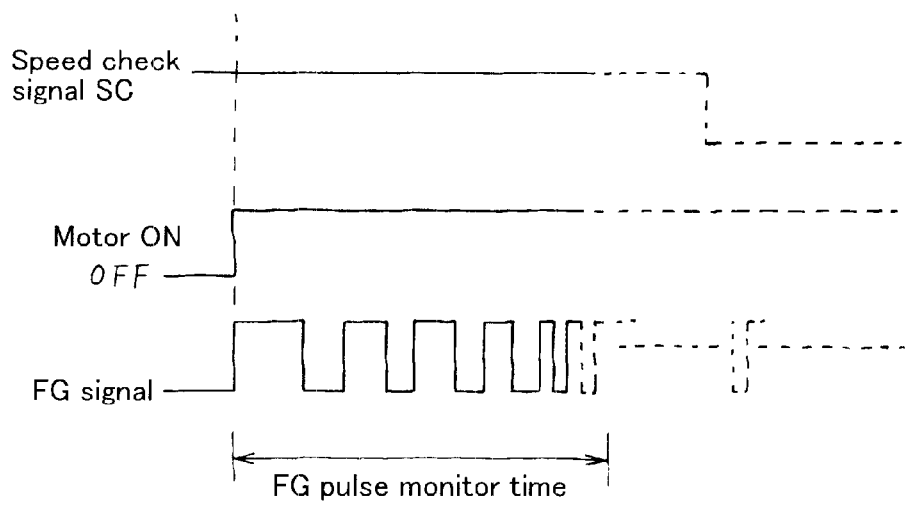
FIG. 8 is a timechart of the FG signal of the process in FIG. 7.
FIG. 9 is a drawing explaining how the rotation status is determined for the process in FIG. 7.

FIG. 7 is a flowchart of the start-up process of a spindle motor of an embodiment of this invention. FIG. 8 is a timechart of that FG signal. FIG. 9 is a drawing that explains how the rotation status is determined. The start-up process of the MPU 12 will be explained according to FIG. 7.

(S1) The MPU 12 makes interrupt processing during error detection of the spindle motor invalid. In other words, when the aforementioned speed-check signal SC becomes 'Hi' during steady rotation, an interrupt occurs. As explained with FIG. 5, the speed-check signal SC is 'Hi' when an error is detected that the rpm of the spindle motor 40 is outside the steady rpm range. As described later, by prohibiting this interrupt, it is possible for the MPU 12 to monitor the rpm of the spindle motor with the speed-check signal SC.

(S2) The MPU 12 sets the target rpm (clock frequency) and start-up direction as parameter settings of the spindle motor 40. In this embodiment, it selects from two rpms (4558 rpm and 3214 rpm) according to the storage capacity of the optical disk that is loaded. For example, for a 1.3 GB optical disk, 3214 rpm is selected, and for all other disks, 4558 rpm is selected. Also, together with supplying this clock to the spindle-motor driver 38, it gives a start-up command to the spindle-motor driver 38. This starts the spindle motor 40.

(S3) The FG signal (pulse) is generated by the rotation of the spindle motor 40. As shown in FIG. 8, the MPU 12 counts the FG signal for a specified time (check time). The rotation status of the spindle motor 40 is determined from this count value. As shown in the table in FIG. 9, at 3214 rpm when the count value is less than ⌈15⌉, the spindle motor 40 is determined to be locked. Similarly, when the count value is greater than ⌈100⌉, the spindle motor 40 is determined to be idling. Moreover, when the count value is between ⌈15⌉ and ⌈100⌉, the spindle motor 40 is determined to be normal. Similarly, at 4558 rpm, when the count value is less than ⌈19⌉, the spindle motor 40 is determined to be locked. When the count value is greater than ⌈125⌉, the spindle motor 40 is determined to be idling. Also, when the count value is between ⌈19⌉ and ⌈125⌉, the spindle motor 40 is determined to be normal. When the spindle motor 40 is locked or idling, processing advances to error processing in step S9.

(S4) When the spindle motor 40 is determined to be normal, the MPU 12 determines whether the speed-check signal SC is 'Lo'. As shown in FIG. 5 showing the relationship between the rpm and the speed-check signal SC, point 'A' is where the speed-check signal SC is first detected to be 'Lo' after start up. The MPU 12 waits until the speed-check signal SC becomes 'Hi'. The speed-check signal SC changes to 'Lo' when the rpm of the spindle motor 40 reaches near the target rpm (steady rpm range).

(S5) The MPU 12 starts the discharge process when the speed-check signal SC becomes 'Lo'. In the circuit shown in FIG. 3, the output port of the MPU 12 is normally 'Lo' (switch OFF). The switch SW is in the open state. During discharge, by making the output port 'Hi' (switch ON), the switch SW closes and the charge circuit 91-1 of the charge pump 91 is connected to ground. This makes discharge possible. Also, in the example circuit in FIG. 6, in order for discharge, by making the port of the tri-state buffer 12-1 of the MPU 12 'Lo', the charge circuit 91-1 of the charge pump 91 is connected to ground. When the port of the tri-state buffer has high impedance (open), the switch is OFF.

(S6) The MPU 12 keeps the switch SW open and continues the discharge process during a specified time starting from point 'A' in FIG. 5. This specified time is set so that overshoot is suppressed and that the motor rpm quickly becomes steady in the steady rotation range. As described later, this specified time varies depending on the target rpm and can be learned.

When the specified time elapses (for example when a timer is detected), the MPU 12 turns OFF the switch SW. This releases the switch SW and the discharge operation ends.

(S7) The MPU 12 performs the steady rotation check. To do this, the MPU 12 determines whether the monitoring time for monitoring the speed-check signal SC has elapsed. When the monitoring time has elapsed, then the error processing of step S9 is performed. When the monitoring time has not elapsed, the speed-check signal SC is checked whether it became 'Lo' in the specified time. When the speed-check signal SC is confirmed to be 'Lo' in the specified time, then the rpm is in the steady rpm range. This corresponds to point 'B' in FIG. 5.

(S8) Finally, interrupt processing, for when a spindle-motor error is detected, is made valid and processing ends. This makes it possible to perform the recovery process when an interrupt occurs do to the speed-check signal.

(S9) When the condition of spindle-motor rotation is not good, or when the speed-check signal SC does not become 'Lo' within the specified time, then error processing is performed and processing ends.

Therefore, since the charge of the charge pump 91 of the spindle-motor driver 38 discharges when the spindle motor 40 reaches near the target rpm, it is possible to suppress overshoot that exceeds the target rpm. This makes it possible to reduce the time for rotation to become steady at the target rpm.

Figure 10:
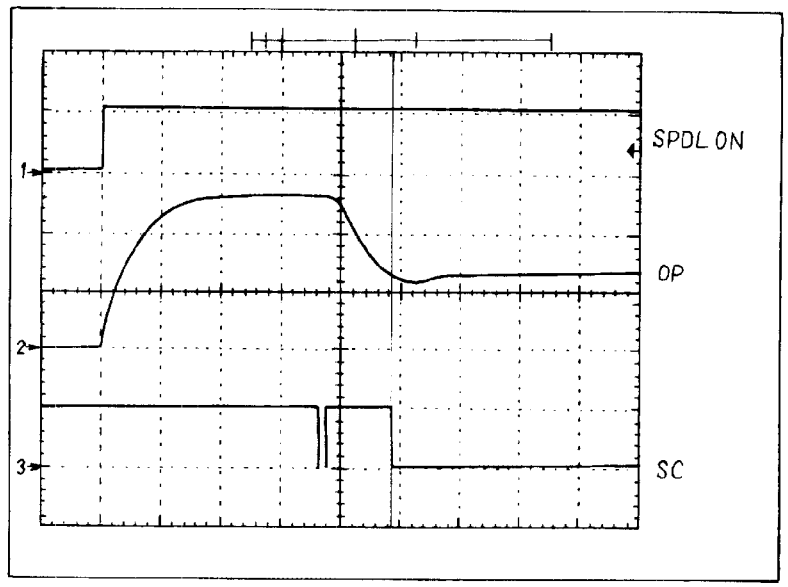
FIGS. 10A and 10B are drawings (1/2) explaining the effects of the discharge in FIG. 7.
Figure 10:
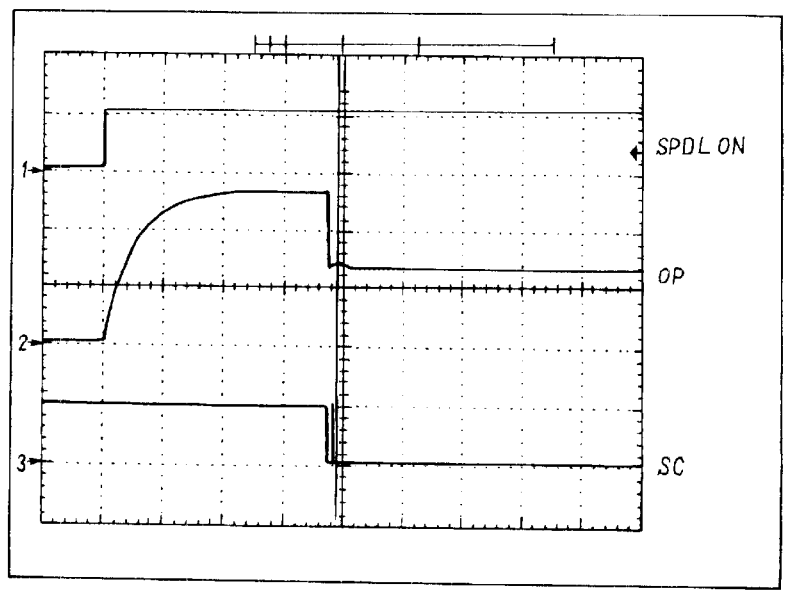
Figure 11:
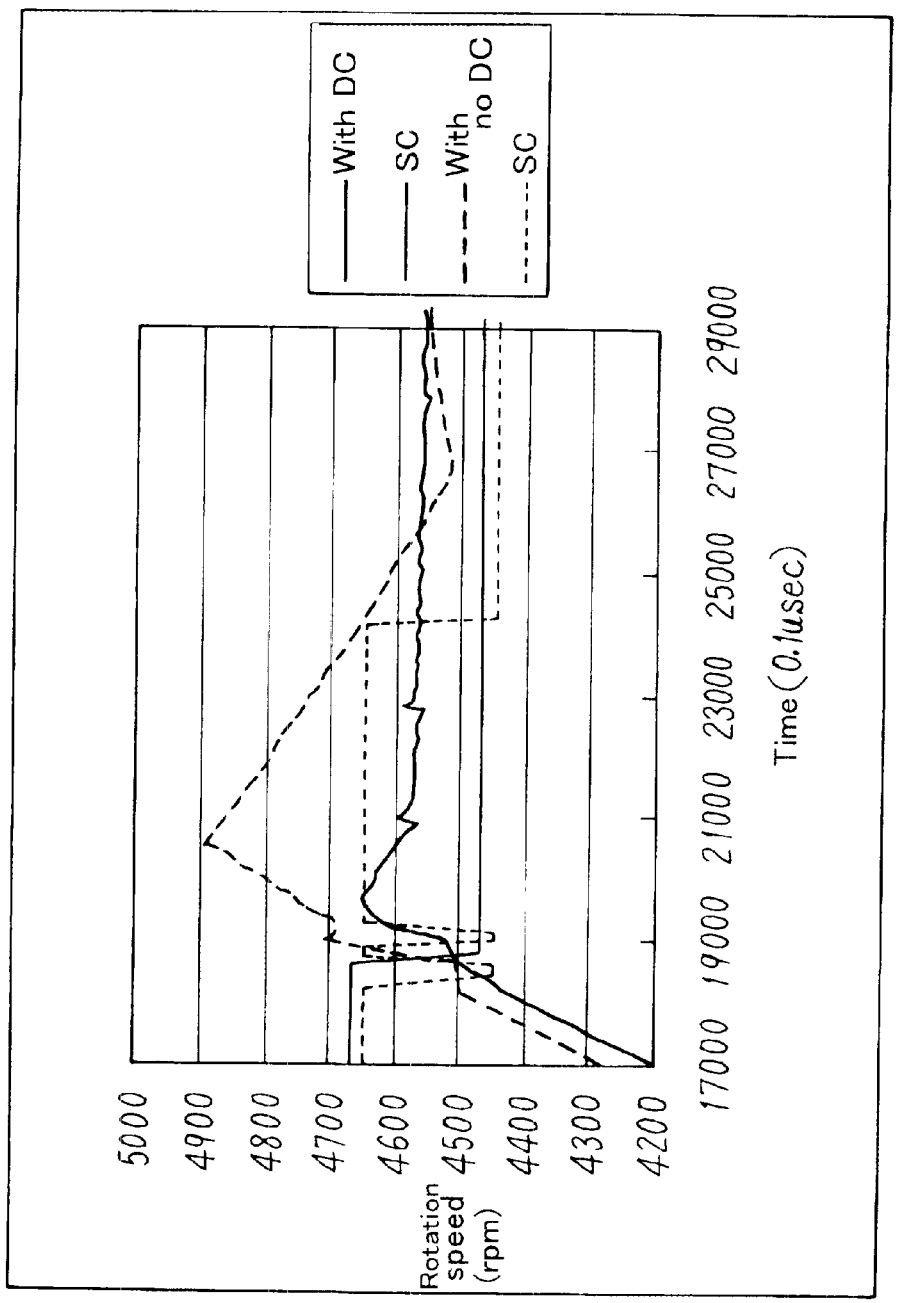
FIG. 11 is a drawing (2/2) explaining the effects of the discharge in FIG. 7.

FIG. 10A, FIG. 10B and FIG. 11 are diagrams explaining the discharge effect.

FIG. 10A shows the output waveform CP of the charge pump 91 and the speed-check signal SC after the spindle motor goes ON when there is no discharge. FIG. 10B shows the output waveform CP of the charge pump 91 and the speed-check signal SC after the spindle motor goes ON when there is discharge.

In comparison with FIG. 10A, FIG. 10B shows that when discharge is performed, the output waveform CP of the charge pump 91 suddenly drops when the speed-check signal SC becomes 'Lo'. This reduces the time until the speed-check signal SC becomes 'Lo'. Therefore, it can be seen that by performing discharge, the rpm more quickly becomes steady at the steady rpm.

FIG. 11 shows the change in rpm of the spindle motor after the spindle motor has been turned ON. Here, the target rpm is 4588 rpm. When discharge is not performed (no DC), due to overshoot, it takes 2.5 seconds for the speed-check signal SC to become stable at 'Lo'. Conversely, when discharge is performed (there is DC), it takes 1.9 seconds for the speed-check signal SC to become stable at 'Lo'. Therefore, it can be seen that by performing discharge, the rpm becomes steady in steady rotation 600 ms faster.

Figure 12:
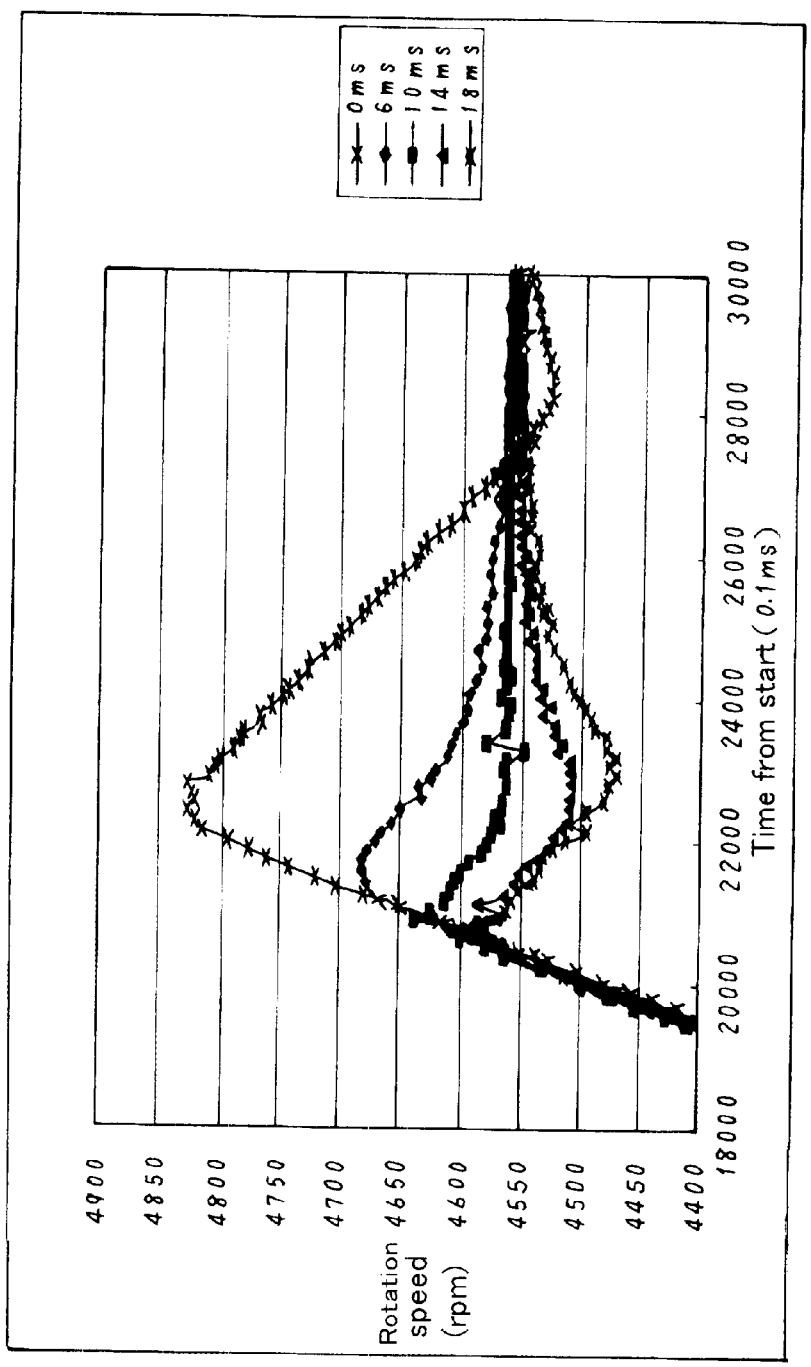
FIG. 12 is a drawing showing the relationship between the discharge time and change in rpm at 4558 rpm.
Figure 13:
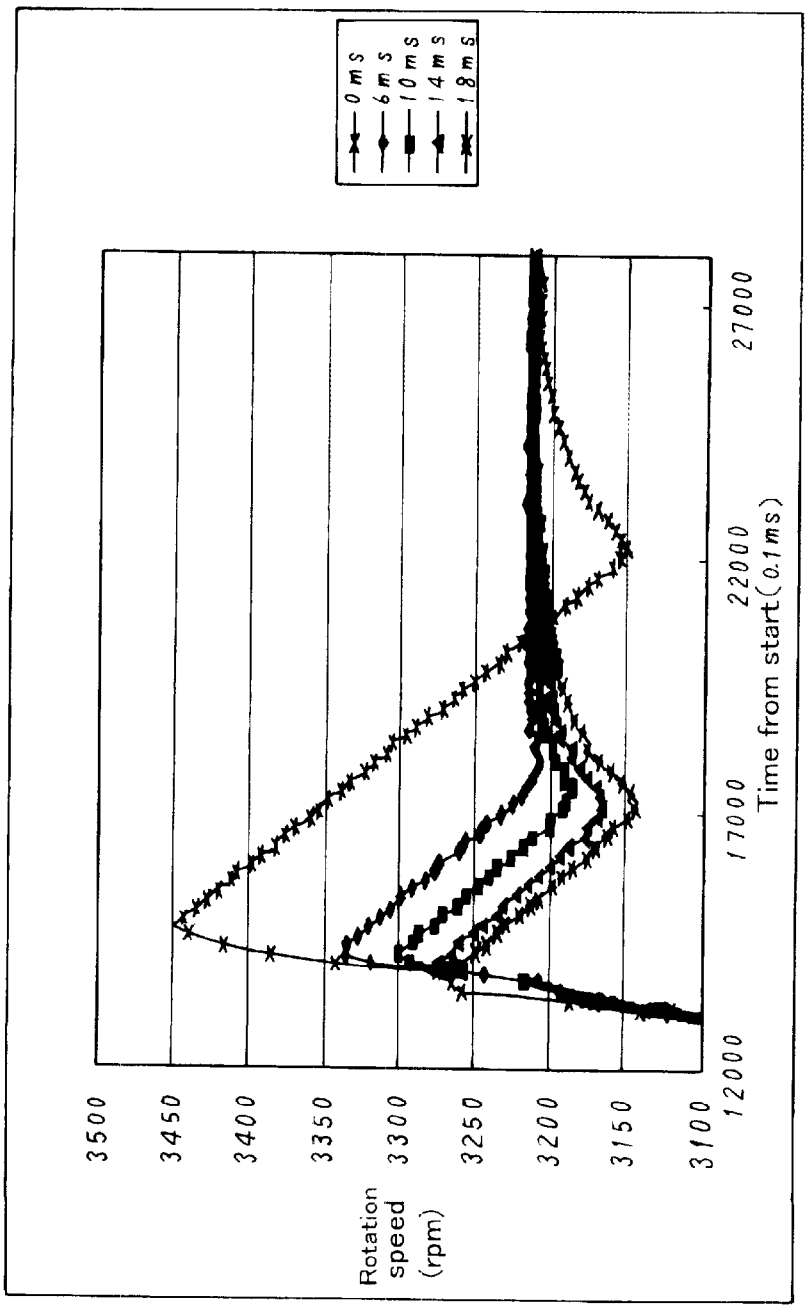
FIG. 13 is a drawing showing the relationship between the discharge time and change in rpm at 3214 rpm.

Next, the discharge time required for effectively controlling overshoot will be explained. FIG. 12 shows the relationship between the discharge time and change in rpm at 4558 rpm. FIG. 13 shows the relationship between the discharge time and change in rpm at 3214 rpm.

FIG. 12 and FIG. 13 show the change in rpm of the spindle motor when the discharge time is set to 0 ms, 6 ms, 10 ms, 14 ms and 18 ms. As can be seen from FIG. 12, when the target rpm is 4558 rpm, the rpm settles at the steady rpm (4558 rpm) fastest when the discharge time is 10 ms. On the other hand, when the target rpm is 3214 rpm, the rpm settles at the steady rpm (3214 rpm) fastest when the discharge time is 10 ms. The discharge time is set such that the rpm settles at the steady rpm in the fastest amount of time.

Figure 14:
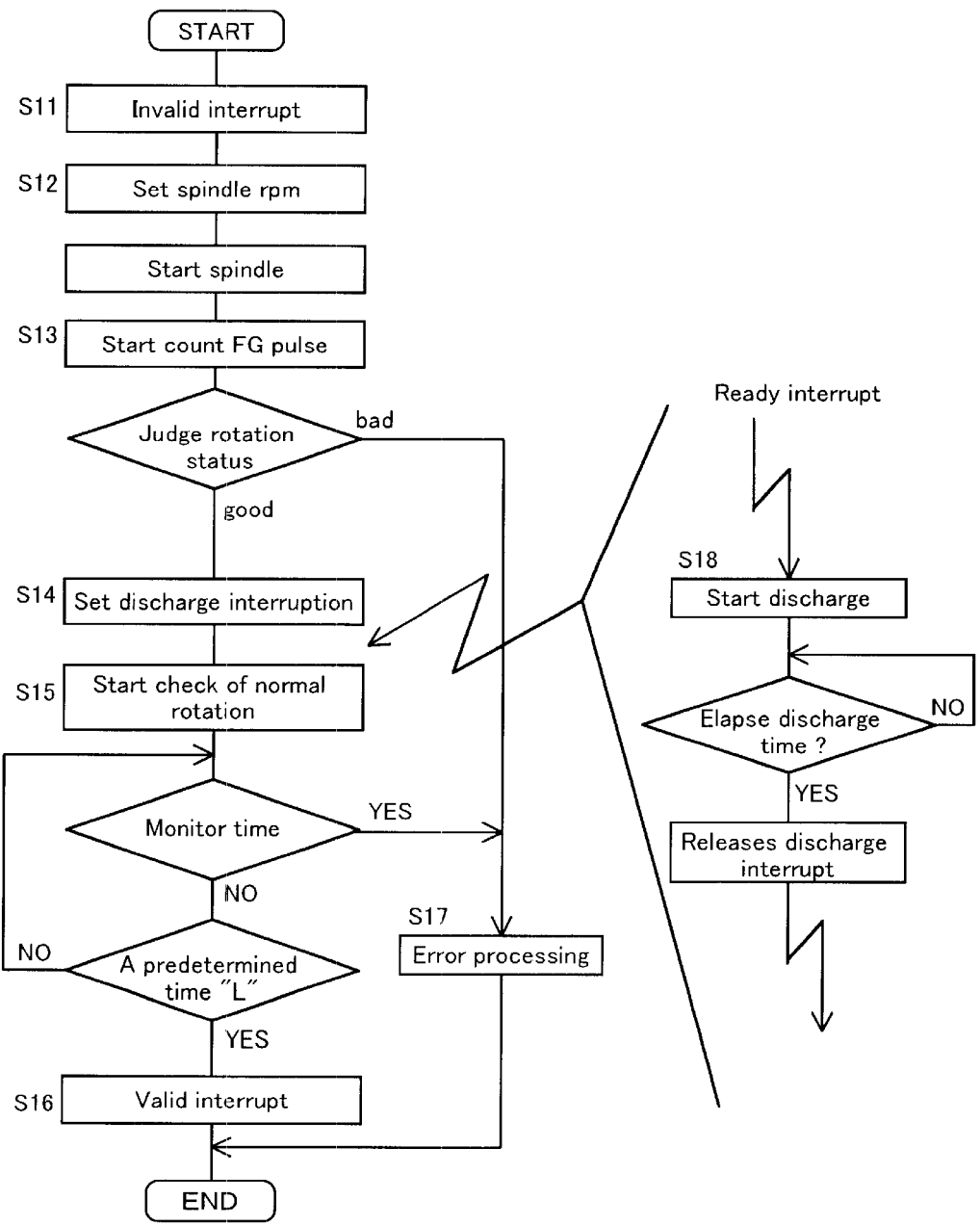
FIG. 14 is a flowchart of the start-up process of another spindle of the invention.

FIG. 14 is a flowchart of the start-up process of the spindle of a second embodiment of the invention.

FIG. 14 is the flowchart when the discharge is performed by interrupt processing of the speed-check signal SC. Steps S11 to S13 are the same as steps S1 to S3 in FIG. 7, and steps S15 to S17 are the same as steps S7 to S9 in FIG. 7. Therefore these steps are omitted from this explanation.

(S14) When the spindle motor is determined to have started properly in step S13, the same as in step S3, the MPU 12 performs discharge interrupt processing. In other words, the MPU 12 sets for an interrupt to occur in the MPU 12 when the speed-check signal SC, as shown in the timechart in FIG. 5, changes to 'Lo'. In addition, the MPU 12 moves to another process.

(S18) The MPU 12 moves to the interrupt process of this step S18 when the speed-check signal SC interrupt, that was set in step S14, occurs. When this happens, the interrupt of this signal is masked so that the speed-check signal SC interrupt does not occur again.

The discharge process starts in step S18. In the example circuit shown in FIG. 13, by making the output port of the MPU 12 'Hi', (switch ON), the switch SW closes and the charge circuit 91-1 of the charge pump connects to ground. Discharge is then performed. Also, in the example circuit in FIG. 6, by making the port of the tri-state buffer of the MPU 12 'Lo', the charge circuit 91-1 of the charge pump 91 connects to ground.

At the same time as this, the MPU 12 starts the discharge timer and moves to another normal process. Here, the timer value that is set is the optimum discharge time shown in FIG. 12 and FIG. 13, as described above.

The MPU 12 receives the discharge-end interrupt from the discharge timer and turns the switch SW OFF. By doing this, the switch SW is opened and the discharge operation ends. Also, the MPU 12 moves to step S15.

Since the discharge process is used as the interrupt process in this way, the MPU 12 can participate in starting and stopping discharge, and can perform other normal processing during this time. Therefore, other normal processing does not have to wait due to the discharge process.

Figure 15:
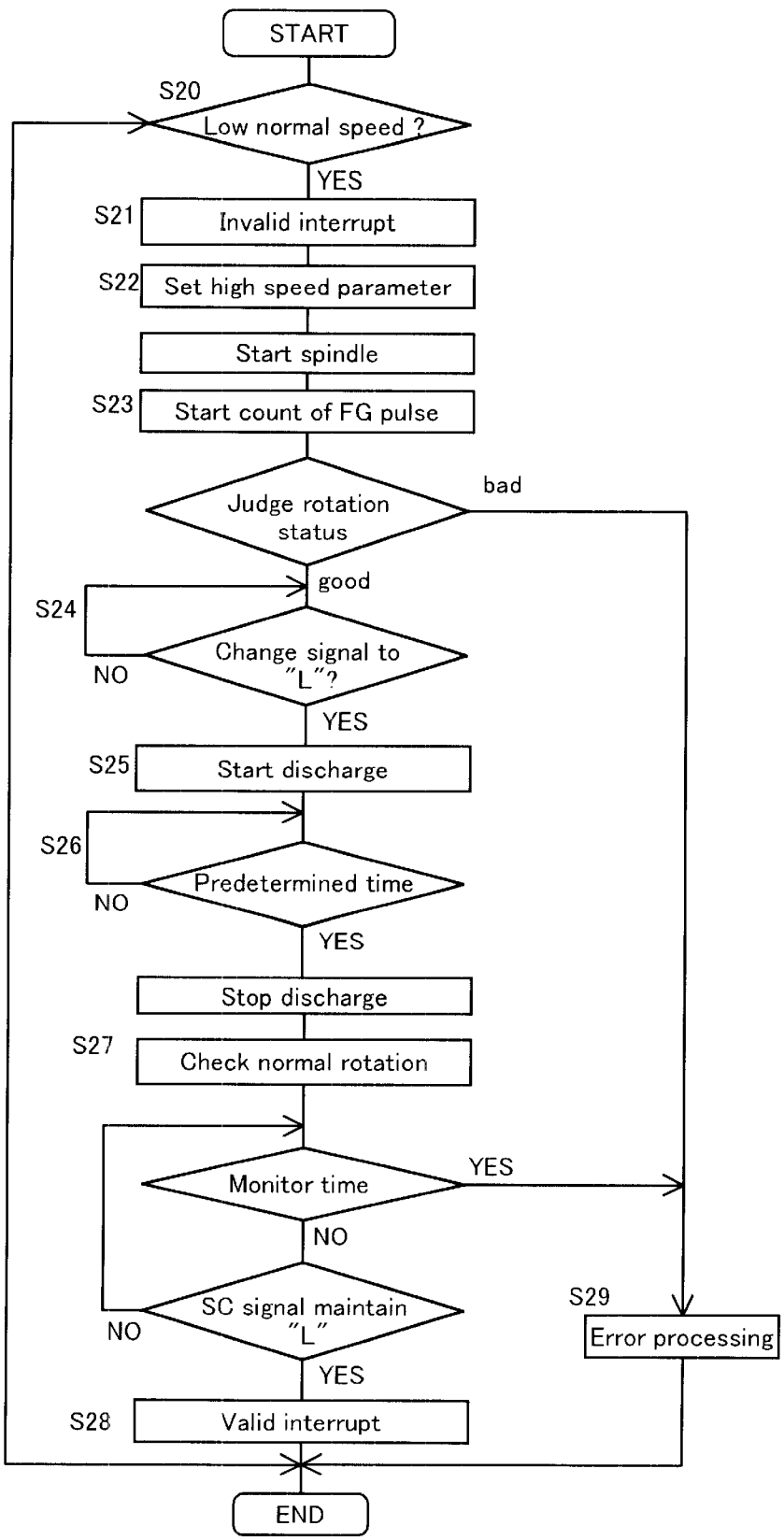
FIG. 15 is a flowchart of the process for changing the rpm of the spindle of an embodiment of the invention.

FIG. 15 is a flowchart of the process of changing the rpm of a spindle of a third embodiment of the invention. FIG. 15 shows the process of raising the rpm of the spindle motor from a Lo speed to a high speed. This process is basically the same as the start-up process in FIG. 7. Refer to the steps shown in FIG. 7 for identical processes.

(S20) The MPU 12 determines whether the spindle motor 40 is in the steady low-speed rotation state. For example, the state is determined from the speed-check signal SC. processing ends when the spindle motor is not in the steady low-speed rotation state.

(S21) Similar to step S1 in FIG. 7, interrupt during error rotation of the spindle motor is made invalid.

(S22) The MPU 12 sets the parameters for high-speed rotation. By doing this, the clock frequency that is given to the spindle-motor driver 38 becomes the frequency of high-speed rotation. Also, the MPU 12 starts the spindle motor.

(S23) Similar to step S3, the MPU 12 counts the FG pulses and determines the rotation state of the spindle motor.

(S24) Similar to step S4, the MPU 12 monitors when the speed-check signal SC changes to 'Lo'.

(S25) Similar to step S5, the MPU 12 starts the discharge process.

(S26) Similar to step S6, the MPU 12 detects when discharge has been performed for the specified time and then ends the discharge process.

(S27) Similar to step S7, the MPU 12 determines when rotation is steady high-speed rotation.

(S28) Similar to step S8, the MPU 12 makes the interrupt during error rotation of the spindle motor valid then ends processing.

(S29) Similar to step S9, the MPU 12 performs error processing then ends processing.

In this way, it is possible quickly raise the spindle motor to high-speed rotation by discharge processing even when raising the rpm from low-speed rotation to high-speed rotation. Therefore, it is possible to reduce the time required to become ready even when there is a sleep function.

Figure 16:
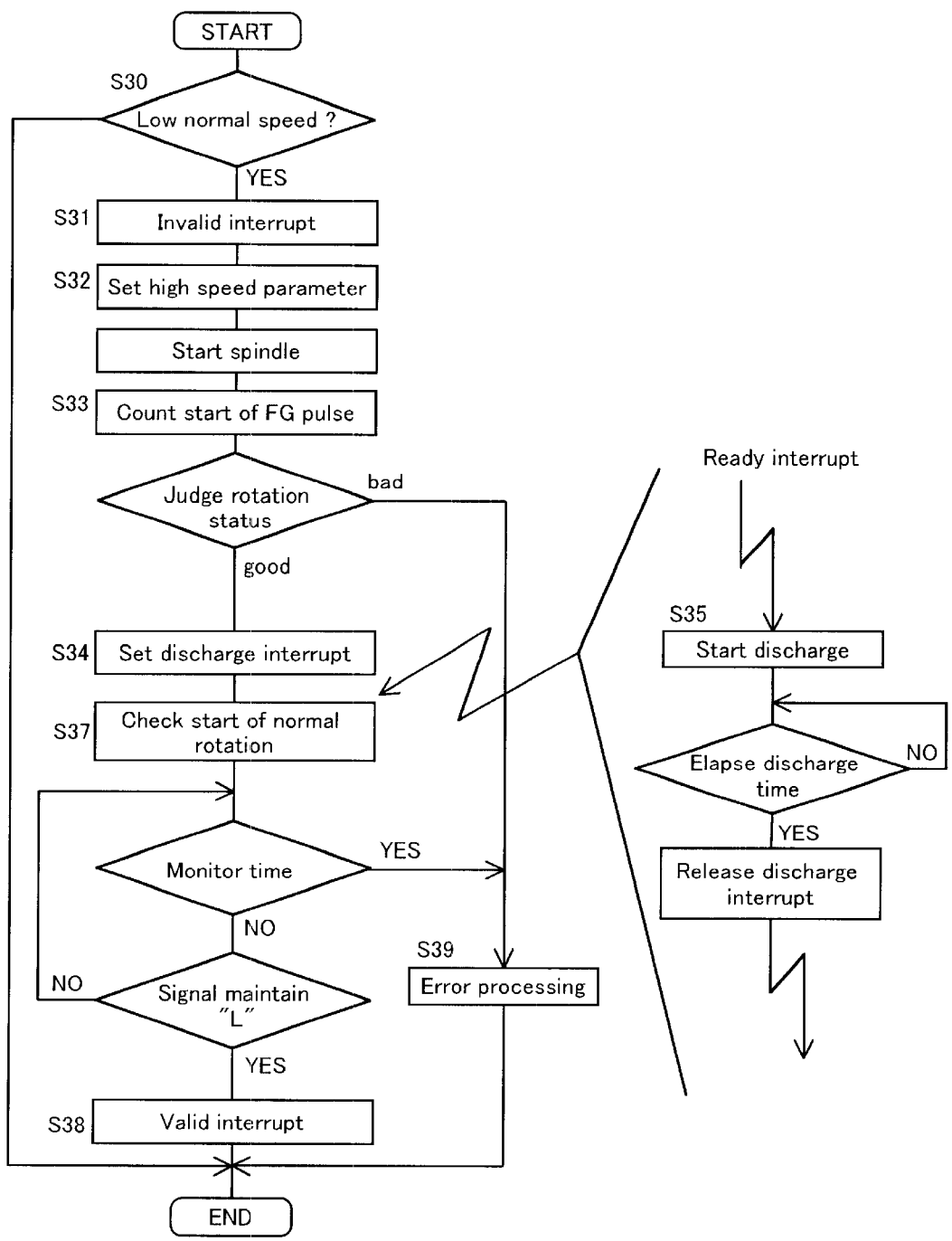
FIG. 16 is a flowchart of the process for changing the rpm of the spindle of another embodiment of the invention.

FIG. 16 is a flowchart of the process for changing the rpm for a spindle of a fourth embodiment of the invention. In FIG. 16, the discharge process shown in FIG. 15 is performed by the interrupt process of the speed-check signal SC. Steps S30 to S33 are the same as steps S20 to S23 in FIG. 15, and steps S37 to S39 are the same as steps S27 to S29 in FIG. 15. Therefore, an explanation of these steps is omitted.

(S34) Similar to step S23, in step S33, the MPU 12 sets the discharge interrupt when it is determined that the spindle motor has started normally. In other words, the MPU 12 sets the interrupt such that it will occur in the MPU 12 when the speed-check signal changes from 'Hi' to 'Lo' in the time-chart shown in FIG. 5 (point 'A' in FIG. 5). In addition, the MPU 12 moves to other processing.

(S35) When the speed-check SC interrupt set in step S34 occurs, the MPU 12 moves to the interrupt processing of this step S35. When this happens, the interrupt of this signal is masked so the speed-check signal SC interrupt does not occur again.

The discharge process starts in step S35. In the example circuit shown in FIG. 3, by making the output port of the MPU 12 'Hi' (switch ON), the switch SW closes and the charge circuit 91-1 of the charge pump 91 connects to ground. Discharge is then performed. Moreover, in the example circuit of FIG. 6, by making the port of the tri-state buffer 12-1 of the MPU 12 'Lo', the charge circuit 91-1 of the charge pump 91 connects to ground.

At this same time, the MPU 12 starts the discharge timer and moves to other normal processing. The timer value set here is the optimum discharge time shown in FIG. 12 and FIG. 12 described above.

The MPU 12 receives the discharge-end interrupt from the discharge timer, and turns OFF the switch SW. By doing this, the switch SW is opened and the discharge operation ends. In addition, the MPU 12 moves to step S37.

Since the discharge process functions as the interrupt process in this way, the MPU 12 participates in the starting and stopping of the discharge, and can perform other normal processing during this time. Therefore, other normal processing does not have to wait due to the discharge process.

The discharge time in these processes is set as the time at a change in rpm. In other words, the discharge time when starting the motor from the stopped state, as well as the discharge time when raising a rotating motor to the high-speed rotation state, are stored in the table. By referring to this table when performing the discharge process, the optimum discharge time is obtained.

This can be applied as well to when the device temperature, power-supply voltage, or start-up rpm changed. For example, the discharge time for each device temperature, power-supply voltage or start-up rpm can be stored in the table. The discharge time can then be approximated from the reference discharge time according to the device temperature, power-supply voltage or start-up rpm.

Next, it is possible to learn this discharge time. The time from when the motor starts until it reaches steady rotation differs according to the discharge time, as shown in FIG. 12 and FIG. 13. In other words, when the proper discharge time is set, rotation of the motor reaches the target rpm in the shortest amount of time. The position of point 'B' shown in FIG. 5 changes according to the discharge time.

By starting and stopping the motor a few times in order to learn the discharge time, it is possible to learn the optimum time. For example, the discharge time is changed each time the motor is started as: 0 ms, 5 ms, 10 ms, 15 ms and so on, and the time is measured from the speed-check signal SC until rpm reaches point 'B' in FIG. 5. The shortest discharge time for this to occur is determined to be the optimum value.

This learning process can be performed once or as many times as necessary. The optimum discharge time for the device that is obtained from the learning process is stored in RAM. During normal start-up of the motor, the discharge process is performed using the discharge time stored in this RAM.

Figure 17:
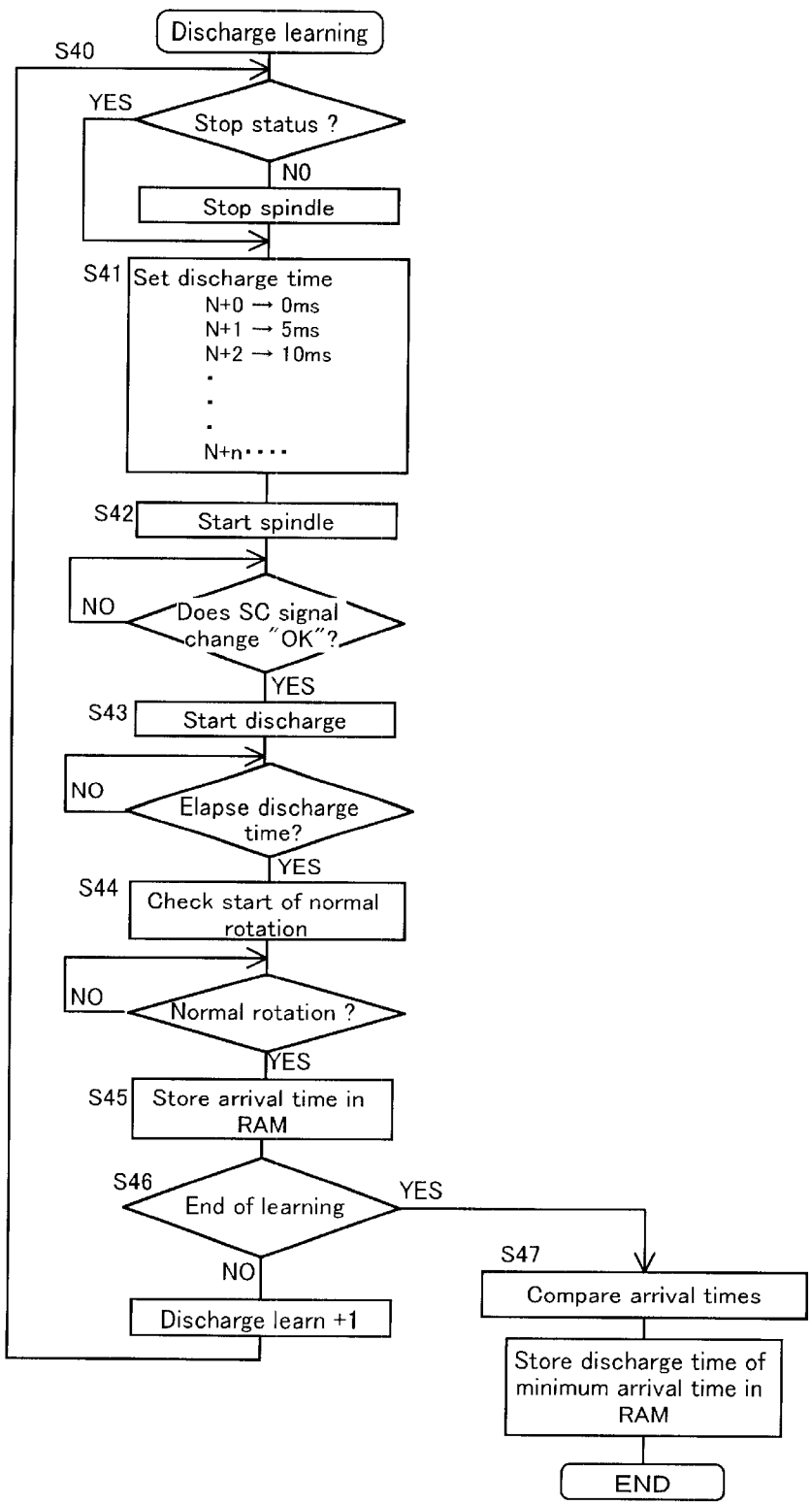
FIG. 17 is a flowchart of the process for learning the discharge time of an embodiment of the invention.

The learning process will be further explained using a flowchart. FIG. 17 is a flowchart of the process for learning the discharge time in an embodiment of this invention.

(S40) The MPU 12 determines whether the spindle motor 40 is in the stopped state. When it is not in the stopped state, the MPU 12 stops the spindle motor.

(S41) The MPU 12 sets the learning discharge time. For example, when learning is to be performed N times, 0 ms is set for the first time (N0), 5 ms is set for the second time (N1), 10 ms is set for the third time (N2), and so on.

(S42) The MPU 12 gives a start-up command to the spindle-motor driver 38. This starts the spindle motor 40. The MPU 12 determines whether the speed-check signal SC has changed to 'Lo'.

(S43) The MPU 12 starts the discharge process when the speed-check signal SC becomes 'Lo'. By making the output port 'Hi' (switch ON), the MPU 12 closes the switch SW and connects the charge circuit 91-1 of the charge pump 91 to ground. Discharge is performed in this way. The MPU 12 keeps the switch SW ON and continues the discharge process for the learning discharge time set in step S41 from point 'A' shown in FIG. 5. When the time reaches the set discharge time, the MPU 12 turns OFF the switch SW. This opens the switch SW and ends the discharge operation.

(S44) The MPU 12 checks for steady rotation. To do this, the MPU 12 checks whether the speed-check signal SC became 'Lo' in the specified time. When the speed-check signal SC is confirmed to be 'Lo' in the specified time, then the rpm is in the steady rpm range. This corresponds to point 'B' in FIG. 5.

(S45) The MPU 12 measures the time t(n) from when the spindle motor 40 starts until it reaches steady rotation, and stores it in RAM.

(S46) The MPU 12 determines whether learning measurement has been performed N times. When learning has not been performed N times, the MPU 12 set the learning discharge time for the nest time (n+1), and returns to step S40.

(S47) When learning measurement has been performed N times, the time t(n) required to arrive at steady rotation for each learning discharge time is stored in RAM. The MPU 12 compares these times to find the minimum time. From the comparison results, the discharge time corresponding to the minimum arrival time is stored in RAM as the learned result. Then the learning process ends.

In this way it is possible to learn the optimum discharge time. Therefore, it is possible to automatically obtain the optimum discharge time for each target rpm for each device.

In addition to the embodiments described above, this invention can be changed as follows:

(1) In the embodiments described above, an example of a spindle motor that rotates a magneto-optical disk in a magneto-optical disk device is explained, however the invention can also be applied to spindle motors of other devices.

(2) It is possible to use a discharge circuit that is constructed differently.

The preferred embodiments of the present invention have been explained, however the invention is not limited to these embodiments and can be embodied in various forms within the scope of the present invention.

The invention, as described above, has the following effect:

(1) After detecting when the actual rpm of the spindle motor reaches near the target rpm, the rotation error that is stored in the charge pump is discharged for a specified time, so it is possible to control and suppress overshoot. In addition, it is possible to reduce the time to reach the target rpm.

(2) The response characteristics of the charge pump are not changed, so it is possible to stably maintain rotation at the target rpm.

(3) Since the start-up time of the spindle motor is reduced and the transmission speed of the disk is improved, it is possible to prevent the time required to reach the ready state from increasing, even when the rpm of spindle motor is high.

What is claimed is:

1. A spindle-motor control device for controlling a speed of a spindle motor comprising:

a detection means for detecting the actual speed of said spindle motor;

a drive circuit for extracting the difference between the target speed and said actual speed, controlling a charge amount of a charge pump with said difference and driving said spindle motor according to said charge amount, said charge pump having charging characteristics so as to suppress rotation jitter during steady rotation; and a control circuit for setting said target speed to said drive circuit during start-up of said spindle motor, detecting when the actual speed of said spindle motor approaches said target speed and forced-discharging said charge pump for a prescribed time in accordance with said detection during start-up of said spindle motor.

2. The spindle-motor control device of claim 1 wherein said control circuit detects when the actual speed of said spindle motor approaches said target speed after said spindle motor has been started.

3. The spindle-motor control device of claim 1 wherein said control circuit detects when the actual speed of said spindle motor has approached said target high-speed speed after an instruction has been given for said spindle motor, rotating at low speed, to rotate at high speed.

4. The spindle-motor control device of claim 1 wherein said charge pump comprises a discharge circuit, operated by said control circuit, for discharging said charge pump.

5. The spindle-motor control device of claim 1, wherein said drive circuit comprises:

a phase comparator for extracting a phase difference between a reference clock as said target speed and a frequency signal to represent said actual speed and outputting a phase difference signal; and said charge pump including at least one condenser of which one end is earthed and the other end receives said difference signal.

6. A disk device comprising:

a spindle motor for rotating a disk;

a head for reading the disk;

a drive circuit for extracting the difference between a target speed and an actual speed of said spindle motor, controlling a charge amount of a charge pump with said difference and driving said spindle motor according to said charge amount; and a control circuit for setting said target speed to said drive circuit when start-up of said spindle motor, detecting when the actual speed of said spindle motor approaches said target speed and forced-discharging said charge pump for a prescribed time during start-up of said spindle motor, wherein said charge pump has charging characteristics so as to suppress rotation jitter during steady rotation.

7. The disk device of claim 5 wherein said control circuit detects when the actual speed of said spindle motor approaches said target speed after said spindle motor has been started.

8. The disk device of claim 5 wherein said control circuit detects when the actual speed of said spindle motor has approached said target high-speed speed after an instruction has been given for said spindle motor, rotating at low speed, to rotate at high speed.

9. The disk device of claim 5 wherein said control circuit sets the step of setting said prescribed time, according to the surrounding temperature, for performing said discharge.

10. The disk device of claim 5 wherein said control circuit learns the prescribed time for performing said discharge.

11. The disk device of claim 6, wherein said drive circuit comprises:

a phase comparator for extracting a phase difference between a reference clock as said target speed and a frequency signal to represent said actual speed and outputting a phase difference signal; and said charge pump including at least one condenser of which one end is earthed and the other end receives said phase difference signal.

12. A spindle-motor control method comprising:

a start-up step for starting-up said spindle-motor; and a steady rotation step for steady rotating said spindle motor with a drive circuit, wherein said drive circuit detects an actual speed of said spindle motor, extracts the difference between a target speed and said actual speed, controls a charge amount of a charge pump with said difference, further wherein said charge pump has charging characteristics so as to suppress rotation jitter during steady rotation, and drives said spindle motor according to said charge amount;

wherein said start-up step includes:

a step of setting said target speed to said drive circuit for driving said spindle motor;

an arrival step of detecting when the actual speed of said spindle motor approaches said target speed; and a step of forced discharging said charge pump for a prescribed time according to said detection.

13. The spindle-motor control method of claim 12, wherein said extracting step comprises:

a step of extracting a phase difference between a reference clock as said target speed and a frequency signal to represent said actual speed and outputting a phase difference signal; and wherein said charge amount control step includes a step of charging said charge pump with said phase difference signal, said charge pump comprising at least one condenser of which one end is earthed and the other end receives said phase difference signal.

14. The spindle-motor control method of claim 12 wherein;

said arrival step comprises;

a step of detecting when the actual speed of said spindle motor approaches said target speed after said spindle motor has been started.

15. The spindle-motor control method of claim 12 wherein;

said arrival step comprises;

a step of detecting when the actual speed of said spindle motor has approached said target high-speed speed after an instruction has been given for said spindle motor, rotating at low speed, to rotate at high speed.

16. The spindle-motor control method of claim 12 further comprising:

a step of setting said prescribed time, according to the surrounding temperature, for performing said discharge.

17. The spindle-motor control method of claim 12 further comprising:

a step of learning the prescribed time for performing said discharge.

18. A spindle-motor control method for controlling a speed of a spindle motor comprising the steps of:

detecting the actual speed of said spindle motor;

extracting the difference between a target speed and said actual speed;

controlling a charge amount of a charge pump with said difference and driving said spindle motor according to said charge amount, said charge pump having charging characteristics so as to suppress rotation jitter during steady rotation;

setting a prescribed time for force-discharging said charge pump according to at least one of said target speed, a surrounding temperature or applied power;

detecting when the actual speed of said spindle motor approaches said target speed; and forced-discharging said charge pump for said prescribed time in accordance with said detection during start-up of said spindle motor.

19. A spindle-motor control device for controlling a speed of a spindle motor comprising:

a detection means for detecting the actual speed of said spindle motor;

a drive circuit for extracting the difference between the target speed and said actual speed, controlling a charge amount of a charge pump with said difference and driving said spindle motor according to said charge amount, said charge pump having charging characteristics so as to suppress rotation jitter during steady rotation; and a control circuit for setting a prescribed time for force-discharging said charge pump according to at least one of said target speed, a surrounding temperature or applied power, detecting when the actual speed of said spindle motor approaches said target speed and forced-discharging said charge pump for said prescribed time in accordance with said detection during start-up of said spindle motor.

20. A disk device comprising:

a spindle-motor for rotating a disk;

a head for reading the disk;

a drive circuit for extracting the difference between a target speed and said actual speed of said spindle motor, controlling a charge amount of a charge pump with said difference and driving said spindle motor according to said charge amount, said charge pump having charging characteristics so as to suppress rotation jitter during steady rotation; and a control circuit for setting a prescribed time for force-discharging said charge pump according to at least one of said target speed, a surrounding temperature or applied power, detecting when the actual speed of said spindle motor approaches said target speed and forced-discharging said charge pump for said prescribed time in accordance with said detection during start-up of said spindle motor.

* * * * *

UNITED STATES PATENT AND TRADEMARK OFFICE
CERTIFICATE OF CORRECTION

PATENT NO. : 6,459,220 B1
DATED : October 1, 2002
INVENTOR(S) : Mochizuki et al.

It is certified that error appears in the above-identified patent and that said Letters Patent is hereby corrected as shown below:

<u>Column 14,</u>
Line 58, delete "5" and insert -- 6 --.

Signed and Sealed this

Seventeenth Day of February, 2004

JON W. DUDAS
*Acting Director of the United States Patent and Trademark Office*